3,037,876
PROCESS FOR MAKING GREENCAKE
Reuben Roseman and Frank O. Rummery, Baltimore, and Joseph Dudley Richards, Lutherville, and Roy W. Chrest, Baltimore, Md., assignors to The Glidden Company, Cleveland, Ohio, a corporation of Ohio
No Drawing. Filed Apr. 11, 1960, Ser. No. 21,157
6 Claims. (Cl. 106—299)

This invention relates to an improvement in process for making greencake for a pigment containing cobalt aluminate (blues) and/or cobalt titanate (greens and bluish greens). Such greencakes are calcined in the presence of molecular oxygen to develop the pigment. The pigments are useful in the preparation of paints, of plastics such as acrylic resins, of resins for synthetic fiber, of ceramic finishes, and of tinted paper.

Heretofore, cobalt-titanium greencakes have been made by mixing, in stoichiometric ratios for cobalt metatitanate, cobalt salts such as cobaltous carbonate with aqueous neutral titanium dioxide pulp and drying the mixture. Additionally, greencakes for cobalt aluminate blues have been made by mixing cobaltous nitrate and aluminum sulfate hydrate, precipitating the hydrous oxides of cobalt and aluminum with a base such as sodium carbonate, washing with water, and filtering the resulting mixture.

Greencakes for superior coalesced green pigments containing cobalt metatitanate have been made by forming an intimate mixture of a cobalt salt with rutile titania-providing material; and greencakes for superior coalesced blue pigments containing cobalt aluminate have been made by adding to such mixture the alumina-providing material. Both of these procedures are in accordance with the teachings of copending U.S. patent application S.N. 21,197, filed on even date herewith by Roy W. Chrest, Frank O. Rummery, J. Dudley Richards, and Reuben Roseman. The process of the instant invention is disclosed in that application as being useful for making such sort of coalesced pigments.

Advantages of the instant invention in preparing greencakes for the foregoing types of pigments over conventional techniques include good suppression of cobalt loss to filtrates without necessarily having to dry the filter cakes, and increased economy and processing uniformity in the preparation of the resulting pigments. Cobalt is a comparatively expensive coloring agent, and losses thereof are definitely undesirable from the standpoint of either economy or product uniformity. Furthermore, many otherwise useful cobalt salts are more expensive than the metal itself per pound of cobalt introduced into the pigments.

Our improvement in process for making greencakes for a pigment containing at least one cobalt compound selected from the group consisting of cobalt titanate and cobalt aluminate from a mixture comprising cobaltous cobalt-providing material and at least one corresponding reactant selected from the group consisting of titania-providing material and alumina-providing material comprises: adding finely-divided elemental cobalt to said mixture as at least a fraction of said cobalt-providing material.

Advantageously, for economy and efficiency in the practice of our invention, pulverulent cobalt metal powder used should be of at least about 100-mesh fineness (U.S. Standard Sieve Series), and preferably it should be fine enough to pass through a 325-mesh screen. Turnings, shreds, wool, and chips of extended surface area, e.g., having thickness of 10 mils or less, can also be used.

We have made excellent pigments containing as low as 0.9% by weight cobalt, expressed as cobaltous oxide, in the finished pigment. Increasing the cobalt content increases the vividness of the green or blue color as a general rule. However, even very small amounts of cobalt oxide or oxides existing uncombined in the finished pigment can give it undesirable hues or undertones. Accordingly, for the cobalt titanate-containing pigments, the fraction of cobalt therein, expressed as cobaltous oxide, should not be above the stoichiometric proportion for making cobalt titanate. Correspondingly, when making cobalt aluminate-containing pigments, the weight fraction of cobalt expressed as cobaltous oxide should not be above the stoichiometric proportion for making cobalt aluminate. The maximum proportion of elemental cobalt used in making the greencake is limited accordingly. Pigments containing both cobalt aluminate and cobalt titanate can contain as much equivalent cobaltous oxide as is necessary for making these coloring compounds without leaving any significant excess of uncombined cobalt oxide or oxides. Generally, then, it can be said that the finished pigments can contain between about 0.9% by weight cobalt expressed as cobaltous oxide and the stoichiometric amount required to form cobalt titanate and/or cobalt aluminate.

The alumina-providing material is preferably a hydrated aluminum sulfate for efficiency and economy, and is converted into a hydrous aluminum oxide with a base such as sodium hydroxide, sodium carbonate, ammonium hydroxide, ammonium hydroxide gassed with hydrogen sulfide, ammonium carbonate, and/or sodium sulfide.

Preferably ammonium compounds are used for such precipitation because no undesirable inorganic residue is left, and the raw pigment cake (i.e., "greencake") need not be washed free of such residue. Alternatively, a hydrous aluminum oxide can be used as the alumina-providing material. Additionally, if desired, other aluminum compounds, particularly water-soluble aluminum salts such as aluminum nitrate, hydrated aluminum acetate, aluminum chloride and the like, can be used. The preferred reaction vehicle for efficiency and economy is water.

When organic materials such as organic aluminum compounds, organic solvents, etc. are present, the organic fractions should be removed from the greencake, e.g., by chemically freeing the organic material, if necessary, and washing it or drying it out before the calcination step is attempted so that carbon residues are not left. These residues would impair the color and value of the aluminum-containing pigment.

The titanium-providing material in the preparation of our pigments is preferably a conventional rutile-forming metatitanic acid cake or an aqueous slurry thereof (an intermediate in the commercial process for forming rutile titanium dioxide pigment). Anatase-forming metatitanic acid cakes or slurries thereof also are useful, as is titanyl sulfate. A fraction of the titania-providing material can be furnished by the addition of pigmentary titania (rutile or anatase) when making cobaltous titanate-containing pigments according to the process of our invention, if desired. In a corresponding preparation where all the cobalt metal added is reactable with the alumina-providing material present to form cobaltous aluminate, and some uncombined titania is desired to be introduced, rutile or anatase pigmentary titania can be incorporated into the greencake prior to calcination or thereafter mixed with the calcined pigment to give it additional opacifying properties.

Our most highly preferred sort of pigments are those wherein cobalt metatitanate and/or cobalt aluminate is coalesced with a significant amount of uncombined rutile titania, i.e., the pigments of the type taught in our copending patent application referred to above. When metatitanic acid cake is used as the titania-providing agent, we have found it possible also to use anhydrous aluminum oxide as the alumina-providing material. However, for a better sort of pigment, we precipitate the alumina-providing material as a hydrous oxide in the presence of pulverulent or otherwise finely-divided cobalt metal and a slurry of rutile-forming metatitanic acid cake, or we compound in an intimate mixture a separately-precipitated hydrous aluminum oxide-cobalt metal admixture with the metatitanic acid cake.

Ordinarily, but not necessarily, an inorganic titania-conditioning agent is added to the greencake prior to its calcination when an excess of titania-providing material over that amount needed to form cobalt titanate with the cobalt present is incorporated into the cake. This is for the following reasons: for directing the formation of the uncombined titania towards the rutile structure; to prevent sintering or fusing together of individual pigment particles into undesirably large aggregates; for adding brightness or for masking a deleterious effect of some stray ion; for adding dispersibility of the pigment in paints or the like; for improving the photochemical stability and chalk resistance; or for reducing phototropy in the pigment.

The titania-conditioning agent can be added as a solid, as a slurry, or as a solution in a solvent such as water. Conventionally the greencake is repulped or otherwise intimately mixed with the titania-conditioning agent. Upon calcination the calcined residue of the agent remains in the pigment, and it comprises generally from about 0.5% to 5% based on the weight of the pigment. If desired, some or all of the calcined residue of the conditioning agent can be removed, for example by washing it out with water or with a mineral acid solution. Agents giving an undesirable stray cast or undertone of color to the pigment should be avoided.

Suitable inorganic titania-conditioning agents include: those containing an alkali metal such as sodium, potassium, and/or lithium. For certain rutile-directing effects on the uncombined titania we have found it advantageous to use sodium carbonate, a mixture of sodium carbonate and phosphoric acid, or lithium sulfate in the range of 1% to 5% based on the weight of equivalent anhydrous titania in the greencake. Organic salts are to be avoided for conditioning the greencake because open calcination their carbon residue gives an inferior product. The superior titania-conditioning agents are those which upon calcination give colorless or virtually colorless residue.

Our pigment compositions recited in the examples hereinafter are given on a basis that is exclusive of the calcined residue of any conditioning agent used. Optionally, also, a small amount of silica-providing material, e.g., sufficient aqueous sodium silicate solution to provide 2–6% of $SiO_2$, based on the weight of finished pigment, can also be incorporated into the greencake, if desired.

Summarizing, then, various techniques for making our greencakes containing titanium, we can: precipitate the hydrous oxde of aluminum from a dissolved aluminum salt in the presence of the pulverulent or otherwise finely-divided (extended surface) cobalt metal and an aqueous suspension of pigment-forming rutile or anatase metatitanic acid cake and recover the resulting solids mixture by filtration; precipitate hydrous aluminum oxide in the presence of the elemental cobalt metal and a suspension of pigmentary titania; evaporate to dryness an aqueous suspension of a metatitanic acid cake or pigmentary titania in intimate association with a dissolved aluminum salt and the elemental cobalt metal; mechanically mix separately prepared aluminum hydrous oxides with the cobalt metal and metatitanic acid cake or pigmentary titania; or mechanically mix with rigorous grinding separately prepared anhydrous aluminum oxide and pulverulent or otherwise finely-divided cobalt metal with metatitanic acid cake. In those instances where no titania-providing material is employed the cobalt metal can be mixed intimately by grinding with an aluminum salt such as hydrated aluminum sulfate; preferably, however, in such instances an aluminum hydrous oxide is precipitated with a base from a water suspension or solution of an aluminum salt and the cobalt metal.

Use of temperatures substantially below about 700° C. converts our greencake into a pigment very slowly, usually incompletely, and therefore is ordinarily avoided. When a titania-providing agent is present with an alumina-providing agent in our greencakes, and such greencakes are calcined above about 1100° C., undesirable extraneous tints and undertones can occur in the resulting pigment. Apparently this is from combination of titanium with aluminum. However, when the metallic cobalt is used with either a titania-providing material alone to make cobalt titanate or with an alumina-providing material alone to make cobalt aluminate, higher temperatures can be tolerated. Calcination can be from an hour to eight hours or even longer, and preferably is done in a period of one to four hours. Times as long as 10 to 24 hours are also permissible, but they appear to induce bluer shades of green in cobalt titanate pigments when the temperature exceeds 900° C.

The greencakes of our invention for blue or predominantly blue pigments containing titanium (those colored by cobalt aluminate) are best calcined at a higher temperature than greencakes for green or predominantly green (those containing a substantial fraction of cobalt titanate), advantageously from about 800° to 1000° C., and preferably between about 950° and 1000°. It is advantageous to calcine the greencakes of our invention for green or predominantly green pigments between about 700° and about 900° C., and preferably at about 775°. The calcining is done in the presence of free oxygen.

The following examples show ways in which our invention has been practiced but should not be construed as limiting the invention. In this specification all parts are parts by weight, all percentages are weight percentages, and all temperatures are in degrees centigrade unless otherwise expressly indicated. The compositions are described in their approximate percentages of equivalent cobaltous oxide, titania, and alumina as compounded.

*Example 1*

An intimate mixture was made of 0.617 part of cobalt metal powder finer than 325 mesh (U.S. Standard Sieve series) and 6.9 parts of rutile-forming metatitanic acid cake containing 35% equivalent titania. This mixture was filtered and the cake repulped with 1% of sodium carbonate on the basis of its equivalent $TiO_2$ content, then calcined in the presence of air at 850° for 3.5 hours. The product was a medium green pigment material containing 76% equivalent titania and 24% equivalent cobaltous oxide. There was no apparent unreacted cobalt, the product being 49.6% cobalt metatitanate coalesced with 50.4% rutile titania.

*Example 2*

An intimate mixture was made by grinding together 8.4 parts of the same kind of cobalt metal powder as used in Example 1 and 262 parts of $Al_2(SO_4)_3 \cdot 18H_2O$. The mixture was calcined at 800° for one hour to get a dark blue pigmentary material containing 78.7% equivalent $Al_2O_3$ and 21.3% equivalent CoO. The product contained 50.2% cobaltous aluminate.

*Example 3*

In this experiment the same kind of cobalt metal powder and aluminum sulfate as used in Example 2 were mixed in the same proportions as used in Example 2. The mixture was suspended in water and aluminum hydrate was precipitated by the addition of sufficient ammonium hydroxide to raise the pH of the slurry to 8. The slurry was filtered, and the resulting cake washed with water. The filter cake was repulped with 1% of sodium carbonate based on the weight of finished pigment, then calcined at 850° for three hours.

The product was a very deep blue pigmentary material containing cobalt aluminate. It was much more intensely colored than the product from Example 2, and also much darker than a corresponding cobalt aluminate pigment made by calcining a neutralized and water-washed mixture of cobaltous sulfate and aluminum sulfate.

We claim:
1. In a process for making a pigment consisting essentially of at least one cobalt colorant compound selected from the group consisting of cobalt titanate and cobalt aluminate, the equivalent cobaltous oxide in the resulting pigment being between about 0.9% and the stoichiometric amount required for forming said cobalt colorant compounds present, from a mixture comprising cobaltous cobalt-providing reactant material and at least one corresponding reactant selected from the group consisting of titania-providing material and alumina-providing material, wherein said mixture is calcined to yield the pigment, the improvement which comprises: adding finely divided elemental cobalt of particle thickness not greater than 10 mils to said mixture as at least a fraction of said cobaltous cobalt-providing reactant material; and calcining the mixture for 1 to 24 hours at 700–1100° C. in the presence of molecular oxygen.

2. The process of claim 1 wherein the finely divided elemental cobalt used is a powder of at least about 100-mesh fineness.

3. The process of claim 1 wherein the alumina-providing material in said mixture is in stoichiometric excess of the amount required for forming cobalt aluminate.

4. The process of claim 1 wherein the entire cobalt-providing material is elemental cobalt.

5. The process of claim 1 wherein the alumina-providing material is aluminum sulfate.

6. The process of claim 1 wherein the titania-providing material is a slurry of metatitanic acid in stoichiometric excess for forming cobalt metatitanate, and the pigment is a coalesced pigment of at least one of said cobalt compounds and uncombined titania.

References Cited in the file of this patent
UNITED STATES PATENTS 2,795,511    Foss et al.    June 11, 1957
2,796,358    Foss    June 18, 1957

OTHER REFERENCES

McEachern: The Mining World, volume 34, January 14, 1911, page 72.